(12) United States Patent
Li et al.

(10) Patent No.: US 9,179,329 B2
(45) Date of Patent: Nov. 3, 2015

(54) APPARATUS AND METHOD FOR INTERFERENCE MITIGATION

(75) Inventors: Yan Li, Beijing (CN); Lu Gao, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 474 days.

(21) Appl. No.: 13/580,950

(22) PCT Filed: Mar. 30, 2010

(86) PCT No.: PCT/CN2010/071417
§ 371 (c)(1),
(2), (4) Date: Dec. 19, 2012

(87) PCT Pub. No.: WO2011/113217
PCT Pub. Date: Sep. 22, 2011

(65) Prior Publication Data
US 2013/0231147 A1    Sep. 5, 2013

(30) Foreign Application Priority Data

Mar. 17, 2010    (CN) .................. PCT/CN2010/071103

(51) Int. Cl.
*H04B 1/10*    (2006.01)
*H04W 24/02*    (2009.01)
(Continued)

(52) U.S. Cl.
CPC ............... *H04W 24/02* (2013.01); *H04B 1/005* (2013.01); *H04B 1/0475* (2013.01); *H04B 1/109* (2013.01); *H04W 72/1215* (2013.01); *H04W 76/06* (2013.01); *H04W 16/14* (2013.01);
(Continued)

(58) Field of Classification Search
CPC ...... H04B 1/005; H04B 1/109; H04B 1/0475; H04W 16/14; H04W 24/02; H04W 72/1215; H04W 72/1284; H04W 76/06; H04W 88/06; Y02B 50/60
USPC ................. 455/63.1, 67.13, 501, 552.1, 553.1
See application file for complete search history.

(56) References Cited

U.S. PATENT DOCUMENTS 5,533,099 A    7/1996  Byrne
7,630,719 B2   12/2009 Bender et al.
(Continued)

FOREIGN PATENT DOCUMENTS

CN    1383636 A    12/2002
CN    1459165 A    11/2003
(Continued)

OTHER PUBLICATIONS

Supplementary European Search Report—EP10847686—Search Authority—Munich—Dec. 4, 2013.
(Continued)

*Primary Examiner* — Raymond Dean
(74) *Attorney, Agent, or Firm* — Joseph Hanasz

(57) ABSTRACT

An apparatus and method for interference mitigation comprising determining if an unscheduled service transmission frequency is in a predefined frequency range; determining if an unscheduled service transmission power is less than a predefined power threshold; and performing one or both of the following: a) erase the baseband signal when an unscheduled service transmission is ON and stop the channel estimation process when the unscheduled service transmission is ON; b) initiate a smart channel information report.

59 Claims, 5 Drawing Sheets

(51) Int. Cl.
  *H04B 1/00* (2006.01)
  *H04B 1/04* (2006.01)
  *H04W 76/06* (2009.01)
  *H04W 72/12* (2009.01)
  *H04W 16/14* (2009.01)
  *H04W 88/06* (2009.01)

(52) U.S. Cl.
  CPC .......... *H04W72/1284* (2013.01); *H04W 88/06* (2013.01); *Y02B 60/50* (2013.01)

(56) References Cited

U.S. PATENT DOCUMENTS

| | | | |
|---|---|---|---|
| 8,179,833 | B2 | 5/2012 | Attar et al. |
| 2001/0023189 | A1 | 9/2001 | Kajimura |
| 2003/0108005 | A1 | 6/2003 | Agrawal et al. |
| 2004/0176039 | A1 | 9/2004 | Leyh et al. |
| 2005/0003836 | A1 | 1/2005 | Inoue et al. |
| 2005/0233704 | A1 | 10/2005 | Maekawa |
| 2007/0060060 | A1 | 3/2007 | Qian |
| 2007/0097931 | A1 | 5/2007 | Parekh et al. |
| 2007/0121535 | A1 | 5/2007 | Chen et al. |
| 2008/0020769 | A1 | 1/2008 | Parekh et al. |
| 2008/0089397 | A1 | 4/2008 | Vetter et al. |
| 2008/0107074 | A1 | 5/2008 | Salmenkaita et al. |
| 2008/0253352 | A1 | 10/2008 | Thoukydides et al. |
| 2009/0010228 | A1 | 1/2009 | Wang et al. |
| 2009/0010242 | A1 | 1/2009 | Leung et al. |
| 2009/0028115 | A1 | 1/2009 | Hirsch |
| 2009/0104905 | A1 | 4/2009 | DiGirolamo et al. |
| 2009/0131054 | A1 | 5/2009 | Zhang |
| 2009/0141689 | A1 | 6/2009 | Parekh et al. |
| 2009/0186577 | A1 | 7/2009 | Ross et al. |
| 2009/0276303 | A1 | 11/2009 | Singhal |
| 2009/0279511 | A1 | 11/2009 | Zhu |
| 2009/0323598 | A1 | 12/2009 | Stamoulis et al. |
| 2010/0056136 | A1 | 3/2010 | Zhu |
| 2010/0061326 | A1 | 3/2010 | Lee et al. |
| 2010/0113055 | A1 | 5/2010 | Iwamura et al. |
| 2010/0267410 | A1 | 10/2010 | Chin et al. |
| 2011/0064048 | A1 | 3/2011 | Oguchi |
| 2011/0097998 | A1 | 4/2011 | Ko et al. |
| 2011/0110251 | A1 | 5/2011 | Krishnamurthy et al. |
| 2012/0008559 | A1 | 1/2012 | Leung et al. |
| 2012/0190362 | A1 | 7/2012 | Subbarayudu et al. |
| 2012/0214523 | A1 | 8/2012 | Senarath et al. |
| 2013/0107867 | A1 | 5/2013 | Li et al. |

FOREIGN PATENT DOCUMENTS

| | | |
|---|---|---|
| CN | 101047954 A | 10/2007 |
| CN | 101051998 A | 10/2007 |
| CN | 101262674 A | 9/2008 |
| CN | 101529729 A | 9/2009 |
| CN | 101610578 A | 12/2009 |
| CN | 102369776 A | 3/2012 |
| EP | 2051551 A2 | 4/2009 |
| JP | 2004343356 A | 12/2004 |
| JP | 2008263582 A | 10/2008 |
| JP | 2009519665 A | 5/2009 |
| JP | 2010041162 A | 2/2010 |
| JP | 2011519521 A | 7/2011 |
| KR | 20020000414 A | 1/2002 |
| WO | 0201761 A1 | 1/2002 |
| WO | 2007069210 A2 | 6/2007 |
| WO | 2008048827 A1 | 4/2008 |
| WO | 2009127276 A1 | 10/2009 |
| WO | 2011116533 A1 | 9/2011 |

OTHER PUBLICATIONS

International Search Report and Written Opinion—PCT/CN2010/071103, International Search Authority—European Patent Office—Dec. 30, 2010.

International Search Report and Written Opinion—PCT/CN2010/071417, International Search Authority—European Patent Office—Dec. 30, 2010.

Qualcomm Europe: "Scheduling of measurements in LTE", 3GPP Draft; R2-060987, 3RD Generation Partnership Project (3GPP), Mobile Competence Centre ; 650, Route Des Lucioles ; F-06921 Sophia-Antipolis Cedex ; France, vol. RAN WG2, No. Athens, Greece; 20060323, Mar. 23, 2006, XP050130916, [retrieved on Mar. 23, 2006].

Qualcomm Europe (Email Rapporteur): Email discussion summary: [62_LTE_CO2] Home eNB inbound mobility support: Remaining issues, 3GPP Draft; R2-083569, 3RD Generation Partnership Project (3GPP), Mobile Competence Centre ; 650, Route Des Lucioles ; F-06921 Sophi-Antipolis Cedex ; France, vol. RAN WG2, no. Warsaw, Poland; 20080624, Jun. 24, 2008, XP050140939, [retrieved on Jun. 24, 2008].

Qualcomm Europe: "Measurement gap scheduling", 3GPP Draft; R2-060058, 3RD Generation Partnership Project (3GPP), Mobile Competence Centre ; 650, Route Des Lucioles ; F-06921 Sophia-Antipolis Cedex ; France, vol. RAN WG2, No. Sophia Antipolis, France; 20060105, Jan. 5, 2006, XP050130222, [retrieved on Jan. 5, 2006].

Qualcomm Europe: "Qualcomm proposal for E-UTRAN Architecture and Protocols" 3GPP Draft; R2-052921, SRD Generation Partnership Project (3GPP), Mobile Competence Centre ; 650, Route Des Lucioles ; F-06921 Sophia-Antipolis Cedex; France, vol. 1, no. Seoul,Korea;20051107, Nov. 1, 2005, XP050130142.

Qualcomm Europe (Rapporteur): "[67#25] UMTS: Inbound mobility", 3GPP Draft; R2-095977-[67#25] UMTS Inbound Mobility, 3RD Generation Partnership Project (3GPP), Mobile Competence Centre ; 650, Route Des Lucioles; F-06921 Sophia-Antipolis Cedex; France, no. Miyazaki; 20091012, Oct. 12, 2009, XP050390401, [retrieved on Oct. 9, 2009].

Attar R. et al., "Evolution of cdma2000 cellular networks: multicarrier EV-DO", IEEE Communications Magazine, IEEE Service Center, Piscataway, US, vol. 44, No. 3, Mar. 1, 2006, pp. 46-53, XP002415258, ISSN: 0163-6804, DOI: 10.1109/MCOM.2006.1607865.

APPARATUS AND METHOD FOR INTERFERENCE MITIGATION

PRIORITY CLAIM

The present application claims priority from International Application No. PCT/CN2010/071103, entitled "Apparatus and Method for Interference Mitigation," filed on Mar. 17, 2010 and assigned to the assignee hereof and hereby expressly incorporated by reference herein.

BACKGROUND

I. Field

This disclosure relates generally to apparatus and methods for interference mitigation. More particularly, the disclosure relates to interference mitigation in a dual mode device.

II. Background

In many telecommunication systems, communications networks are used to exchange messages among several cooperating spatially-separated devices. The various types of networks may be classified in different aspects. In one example, the geographic scope of the network could be over a wide area, a metropolitan area, a local area, or a personal area, and the corresponding networks would be designated as wide area network (WAN), metropolitan area network (MAN), local area network (LAN), or personal area network (PAN). Networks also differ in the switching/routing technique used to interconnect the various network nodes and devices (e.g. circuit switching vs. packet switching), in the type of physical media employed for transmission (e.g. wired vs. wireless), or in the set of communication protocols used (e.g. Internet protocol suite, SONET (Synchronous Optical Networking), Ethernet, etc.).

One characteristic of communications networks is the choice of wired or wireless media for the transmission of electrical signals among the constituents of the network. In the case of wired networks, tangible physical media such as copper wire, coaxial cable, fiber optic cable, etc. are employed to propagate guided electromagnetic waveforms which carry message traffic over a distance. Wired networks are a static form of communications networks and are typically favored for interconnection of fixed network elements or for bulk data transfer. For example, fiber optic cables are often the preferred transmission media for very high throughput transport applications over long distances between large network hubs, such as, bulk data transport across or between continents over the Earth's surface.

On the other hand, wireless networks are often preferred when the network elements are mobile with dynamic connectivity needs or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks have the distinct advantage of facilitating user mobility and rapid field deployment compared to fixed wired networks. However, usage of wireless propagation requires significant active resource management among the network users and high levels of mutual coordination and cooperation for compatible spectrum utilization. Wireless propagation is also subject to interference among the various users so that interference mitigation techniques are required for acceptable operation.

SUMMARY

Disclosed is an apparatus and method for interference mitigation in a dual mode device. According to one aspect, an apparatus and method for interference mitigation comprising determining if an unscheduled service transmission frequency is in a predefined frequency range; determining if an unscheduled service transmission power is less than a predefined power threshold; and performing one or both of the following: a) erase the baseband signal when an unscheduled service transmission is ON and stop the channel estimation process when the unscheduled service transmission is ON; or b) initiate a smart channel information report.

According to another aspect, an apparatus comprising a processor and a memory, the memory containing program code executable by the processor for performing the following: determining if an unscheduled service transmission frequency is in a predefined frequency range; determining if an unscheduled service transmission power is less than a predefined power threshold; and performing one or both of the following: a) erase the baseband signal when an unscheduled service transmission is ON and stop the channel estimation process when the unscheduled service transmission is ON; b) initiate a smart channel information report.

According to another aspect, an apparatus for interference mitigation comprising means for determining if an unscheduled service transmission frequency is in a predefined frequency range; means for determining if an unscheduled service transmission power is less than a predefined power threshold; and means for performing one or both of the following: a) erase the baseband signal when an unscheduled service transmission is ON and stop the channel estimation process when the unscheduled service transmission is ON; b) initiate a smart channel information report.

According to another aspect, a computer-readable medium storing a computer program, wherein execution of the computer program is for: determining if an unscheduled service transmission frequency is in a predefined frequency range; determining if an unscheduled service transmission power is less than a predefined power threshold; and performing one or both of the following: a) erase the baseband signal when an unscheduled service transmission is ON and stop the channel estimation process when the unscheduled service transmission is ON; b) initiate a smart channel information report.

One potential advantage of the present disclosure is a robust technique to handle interference in a dual mode device.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
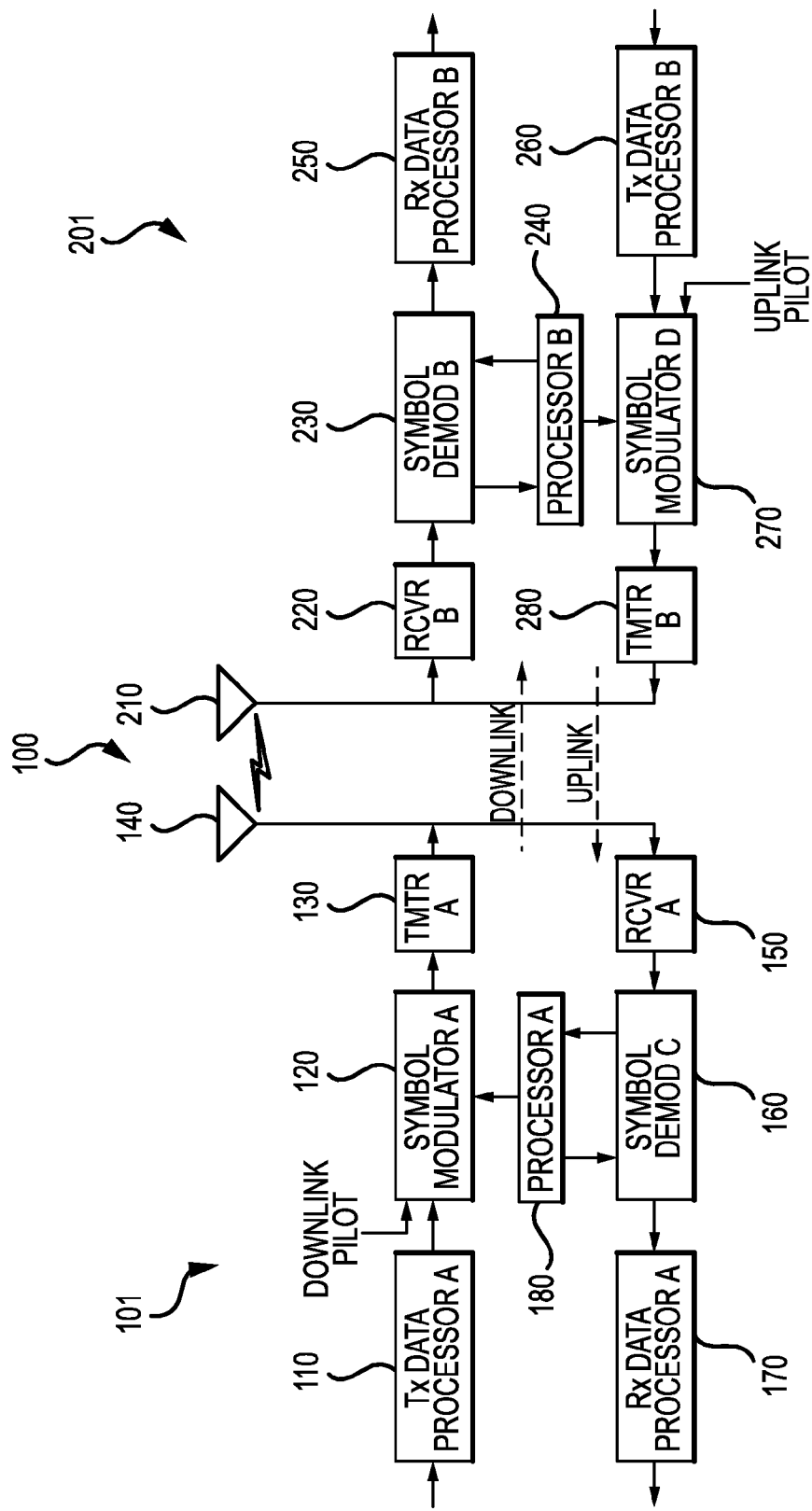
FIG. 1 illustrates an example block diagram of an access node/UE system.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate TDD (LCR-TDD or TD-SCDMA). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

FIG. 1 illustrates an example block diagram of an access node/UE system 100. In one aspect, the access node/UE system 100 is known as an access network/access terminal system. One skilled in the art would understand that the example access node/UE system 100 illustrated in FIG. 1 may be implemented in a frequency division multiple access (FDMA) environment, an orthogonal frequency division multiple access (OFDMA) environment, a code division multiple access (CDMA) environment, a wideband code division multiple access (WCDMA) environment, a low chip rate TDD (LCR-TDD or TD-SCDMA) environment, a time division (TDMA) environment, a spatial division multiple access (SDMA) environment, or any other suitable wireless environment.

The access node/UE system 100 includes an access node 101 (e.g., base station) and a user equipment or UE 201 (e.g., wireless communication device or mobile station). In the downlink leg, the access node 101 (e.g., base station) includes a transmit (TX) data processor A 110 that accepts, formats, codes, interleaves and modulates (or symbol maps) traffic data and provides modulation symbols (e.g., data symbols). The TX data processor A 110 is in communication with a symbol modulator A 120. The symbol modulator A 120 accepts and processes the data symbols and downlink pilot symbols and provides a stream of symbols. In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In another aspect, the downlink pilot symbols are code division multiplexed (CDM). In yet another aspect, the downlink pilot symbols are time division multiplexed (TDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (e.g., data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), interleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In another aspect, the uplink pilot symbols are code division multiplexed (CDM). In yet another aspect, the uplink pilot symbols are time division multiplexed (TDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (e.g., base station) and at the UE 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the access node/UE system 100 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of UEs. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
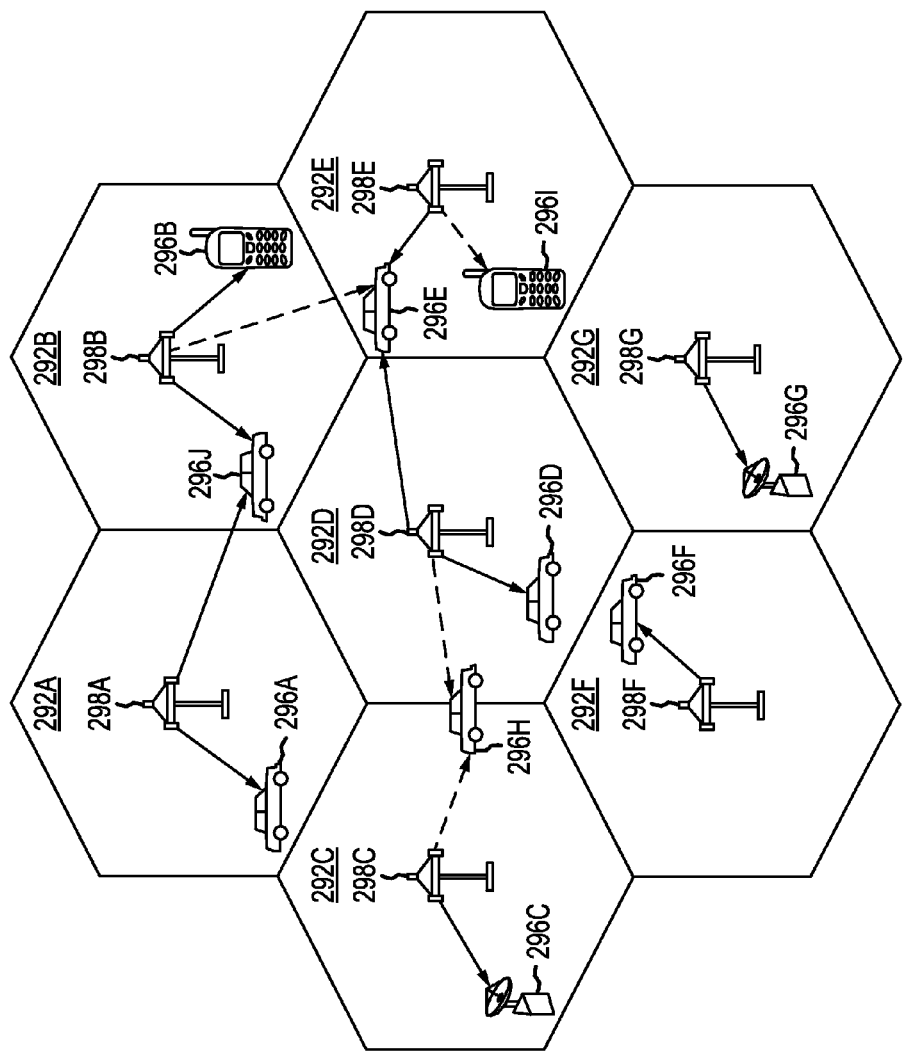
FIG. 2 illustrates an example of a wireless communications system that supports a plurality of users.

FIG. 2 illustrates an example of a wireless communications system 290 that supports a plurality of users. In FIG. 2, reference numerals 292A to 292G refer to cells, reference numerals 298A to 298G refer to base stations (BS) or base transceiver station (BTS) and reference numerals 296A to 296J refer to access User Equipments (UE). Cell size may vary. Any of a variety of algorithms and methods may be used to schedule transmissions in system 290. System 290 provides communication for a number of cells 292A through 292G, each of which is serviced by a corresponding base station 298A through 298G, respectively.

In one example, wireless networks employ various wireless protocols. Example versions of wireless protocols include Global System for Mobile Communications (GSM), Universal Mobile Telecommunications System (UMTS), High Speed Downlink Packet Access (HSDPA), High Speed Uplink Packet Access (HSUPA), Long Term Evolution (LTE), etc. In another example, high rate packet data (HRPD) transmission is part of the cdma2000 wireless standard. Wireless systems compliant with these protocols are used for various communication services such as telephony, messaging, data transfer, emails, Internet access, audio broadcasts, video communications, etc. These wireless systems generally utilize an access node (AN), also known as base station (BS) or Node B, to connect to an individual access terminal (AT), also known as user equipment (UE) or user device, to fixed telecommunications infrastructure networks. In general, a radio coverage area is implemented using a plurality of base stations using a cellular-based topological architecture to provide wireless access, also known as an air interface, to the UEs (e.g., user devices). Examples of fixed telecommunications infrastructure networks include the public switched telephony network (PSTN), Internet, private data networks, etc. In one aspect, the base stations may be connected to a Radio Network Controller (RNC) to facilitate the interconnection to the fixed telecommunications infrastructure networks.

In some cases, wireless network operators desire simultaneous scheduled service and unscheduled service dual mode operation. In one aspect an unscheduled service is GSM, TD-SCDMA or other TDMA system. In another aspect, the scheduled service is one of the following: LTE FDD, LTE TDD, HSPA, TD-SCDMA, TD-SCDMA with HSPA, IEEE802.16d, IEEE802.16e, IEEE802.16m, IEEE802.11ac, IEEE802.11n, IEEE802.20 or HRPD. In one example, both unscheduled service and scheduled service transceivers may operate in a connected mode at the same time. In one aspect, there may be some overlap between a scheduled service terminal receive (RX) band and unscheduled service terminal transmit (TX) band for some countries, for example, China. In one example, unscheduled service transmission in an unscheduled service band overlapping with or adjacent to a CDMA receive band (e.g. 885-905 MHz) may block the CDMA receiver and cause severe scheduled service receiver performance degradation.

If a scheduled service preamble collides with an unscheduled service transmission burst, in one use, for example HRPD, the preamble cannot be detected by a scheduled service receiver. In HRPD system, a preamble is used to indicate the destination of the transmitting packet. In other cases, for example but not limited to HSDPA, TD-SCDMA with HSDPA, etc., the resource allocated to a designated user and user identifier are transmitted to user in high speed shared control channel (HS-SCCH). In this case, a HS-SCCH collision will cause the UE to not be aware that a packet is to be sent to it and consequently the UE will not send any acknowledgement or negative acknowledgement message back to NodeB or eNodeB. In one example, the notion of a preamble may be extended to a wider concept, i.e., a container that includes an identifier of a terminal that the packet is being transmitted to and/or a resource block allocated for this transmission (a.k.a. identifier container).

In one example, an access terminal (AT) may not be aware that a packet has been sent to it and consequently the access terminal (AT) will not send any acknowledgement or negative acknowledgement (ACK/NACK) message back to the access node (AN). In one aspect, the scheduled service ACK/NACK message is an on/off based signal. The AT silence may be interpreted as a non-successful reception by the AN. In one example, the AN will continue to transmit remaining sub-packets based on a scheduled service synchronized hybrid automatic repeat request (H-ARQ) protocol. However, all the successive re-transmission packets may not be detected by the AT and the forward link capacity would be wasted. In an example, such a link transmission failure may be recovered only by an upper protocol layer, such as the Radio Link Protocol (RLP), Transmission Control Protocol (TCP), etc.

In one example, if a collision occurs on a scheduled service data part, the data packet may not be decoded properly due to limited forward error correction (FEC) capability of high data rate packets to combat the additional unscheduled service interference. Due to the collision of preamble or identifier container and data reception with unscheduled service transmission, the scheduled service downlink packet error rate (PER) will be increased significantly and the air interface resource will be wasted. In one aspect, a scheduled service access node (AN) may not be able to take action to assist the scheduled service access terminal (AT) to combat the unscheduled service transmission interference and avoid wasting scarce air interface resources. In one example, the unscheduled service transmission interference is in-band interference. In another example, the unscheduled service transmission interference is out-of-band interference. In another aspect, other users in the serving scheduled service cell may also suffer from resource waste due to unscheduled service interference on certain dual mode user devices. Therefore, it is important to provide an effective mitigation technique against unscheduled service interference to a scheduled service receiver in a concurrent dual mode user device. Disclosed herein is a mitigation technique against unscheduled service interference which uses a smart channel information report.

In another aspect, a smart channel information report implements several key functions. For example, one function is used to predict interference timing and to help avoid the interference, or to help avoid being scheduled at the time when interference happens. In another example, one function is used to decide the proper channel information report based on the interference situation and new FEC capability with interference. In one aspect, the smart channel information report may be used with either a distributed scheduling mechanism or a centralized scheduling mechanism.

In one aspect, a smart channel information report mechanism is disclosed to solve the problem of preamble or identifier container collision. In an example, the smart channel information report mechanism includes a data rate control (DRC) report time selection mechanism and a DRC content decision mechanism which can select DRC index based on the new forward error correction (FEC) capability and adapt to signal-to-interference-and-noise ratio (SINR) degradation and guarantee correct packet delivery. In one example, the data rate control (DRC) report time selection mechanism provides the function of predicting interference timing. And, in one example, the DRC content decision mechanism provides the function of deciding the proper channel information report based on the interference situation and new FEC capability with interference. More generally, in one aspect, the smart channel report mechanism includes a channel quality information (CQI) based channel information report. The CQI may include, for example, received signal strength indication (RSSI), bit error rate, frame error rate, packet error rate, fade statistics, signal-to-noise ratio (SNR), signal-to-interference and noise ratio (SINR), etc. One skilled in the art would understand that the examples listed here for CQI are not exclusive and does not preclude other examples.

In the case of the DRC examples, given that a dual mode user device knows the unscheduled service transmission timing, a scheduled service receiver can predict a preamble collision timeslot. If there is a potential preamble collision in a DRC validation period, with the disclosed DRC report time selection mechanism, the AT can report a data rate condition to the AN so that the AN can avoid packet transmission to the AT at the timeslot which has a potential preamble collision. In one aspect, a data rate condition is a zero data rate. In another aspect, a data rate condition is DRC NULL.

In one example, if the unscheduled service interference is in a data portion of a packet, the interfered portion may be erased before decoding, which would degrade forward error correction (FEC) capability and lead to higher packet error rate (PER). This means that the signal-to-interference-and-noise ratio (SINR) working point for a certain transmission format has to be changed to maintain, for example, a 1% PER when the eraser is on in the receive chain. In one aspect the disclosed DRC index selection mechanism is proposed to adapt to the forward error correction capability with eraser. In one example, the eraser sets the signal magnitude to zero in the positions of the packet with large interference. For example, the original DRC index look up table may be modified, or the SINR threshold may be backed off according to new forward error correction capability. In another example, some transmission formats may be forbidden with unscheduled service interference.

In one aspect, the disclosed DRC index selection mechanism may adapt to the forward error correction capability with eraser. Table 1 is a look-up table for DRC index decision. The DRC report look-up table may be adjusted according to the example Table 1 below or to the practical FEC capability of the baseband chipset when unscheduled service is in talking mode. When unscheduled service is not in talking mode, the original DRC report table may be used by the scheduled service AT. The backoff values are shown in Table 1.

TABLE 1

| DRC index | FTC transmission format | Data rate, kbps | SINR backoff, dB |
|---|---|---|---|
| 1 | (1024, 16, 1024) | 38.4 | 0.72 |
| 2 | (1024, 8, 512) | 76.8 | 0.71 |
| 3 | (1024, 4, 256) | 153.6 | 0.95 |
| 4 | (1024, 2, 128) | 307.2 | 1.36 |

TABLE 1-continued

| DRC index | FTC transmission format | Data rate, kbps | SINR backoff, dB |
|---|---|---|---|
| 5 | (2048, 4, 128) | 307.2 | 1.17 |
| 6 | (1024, 1, 64) | 614.4 | 4.73 |
| 7 | (2048, 2, 64) | 614.4 | 1.93 |
| 8 | (3072, 2, 64) | 614.4 | 2.35 |
| 10 | (4096, 2, 64) | 1228.8 | 16.65 |

In one example, only nine formats may be selected and SINR may be increased with the values in the column of backoff SINR compared to the regular DRC look-up table stored in the chipset. In one example, the formats with large packet data rate are not recommended since its PER performance is likely inferior with unscheduled service interference, based on simulation and lab test results. Moreover, a high PER cannot be recovered by FEC capability, so it should be avoided from wasting the network capacity. In one aspect, the disclosed DRC content decision mechanism decides the DRC content based on adjusted DRC report look-up table when unscheduled service interference exists. Furthermore, the pilot channel measurement may be off if the pilot is erased. One skilled in the art would understand that the examples given herein relating to DRC are examples of a smart channel information report mechanism and should not be construed as limiting. Other examples of smart channel information report mechanisms can be used without affecting the spirit or scope of the present disclosure. And, as the preamble is disclosed herein with the DRC examples, in non-DRC examples, an identifier container is herein disclosed.

In one example, a frequency range and unscheduled service transmission power level detection may be performed to decide whether the interference can be overcome by the implementation isolation. In one example, the isolation is defined as the coupling between the unscheduled service transmitter and the scheduled service receiver. Furthermore, the unscheduled service transmission power level threshold may depend on unscheduled service transmission frequency and the isolation and FEC design in the handset and chipset. In one example, the FEC design is based on block codes. In another example, the FEC design is based on convolutional codes. In another example, the FEC design is based on concatenated codes. In another example, the FEC design includes interleaving. In another example, the FEC design is based on a turbo code. In one example, the functional relationship between unscheduled service transmission power level threshold and unscheduled service transmission frequency may be decided and optimized for each handset and chipset design. If the interference can be overcome, the user device receiver proceeds with the routine scheduled service baseband transceiver processing. But, if the interference cannot be overcome, the user device transceiver performs the special processing in both receiver and transmitter before performing the routine baseband processing. In the user device transmitter, the DRC report time selection and the DRC content decision decide the DRC report content jointly before performing the routine transmitter processing. In the user device receiver, the eraser erases the baseband signal interfered by unscheduled service transmit signal.

Table 1 (above) illustrates an example new look-up table for DRC index selection for different DRC index values. For reference, the forward traffic channel (FTC) transmission format is expressed, for example, as a triplet of values (a,b,c), where a is the physical layer packet size in bits, b is the nominal transmit duration in slots, and c is the preamble length in chips.

Figure 3:
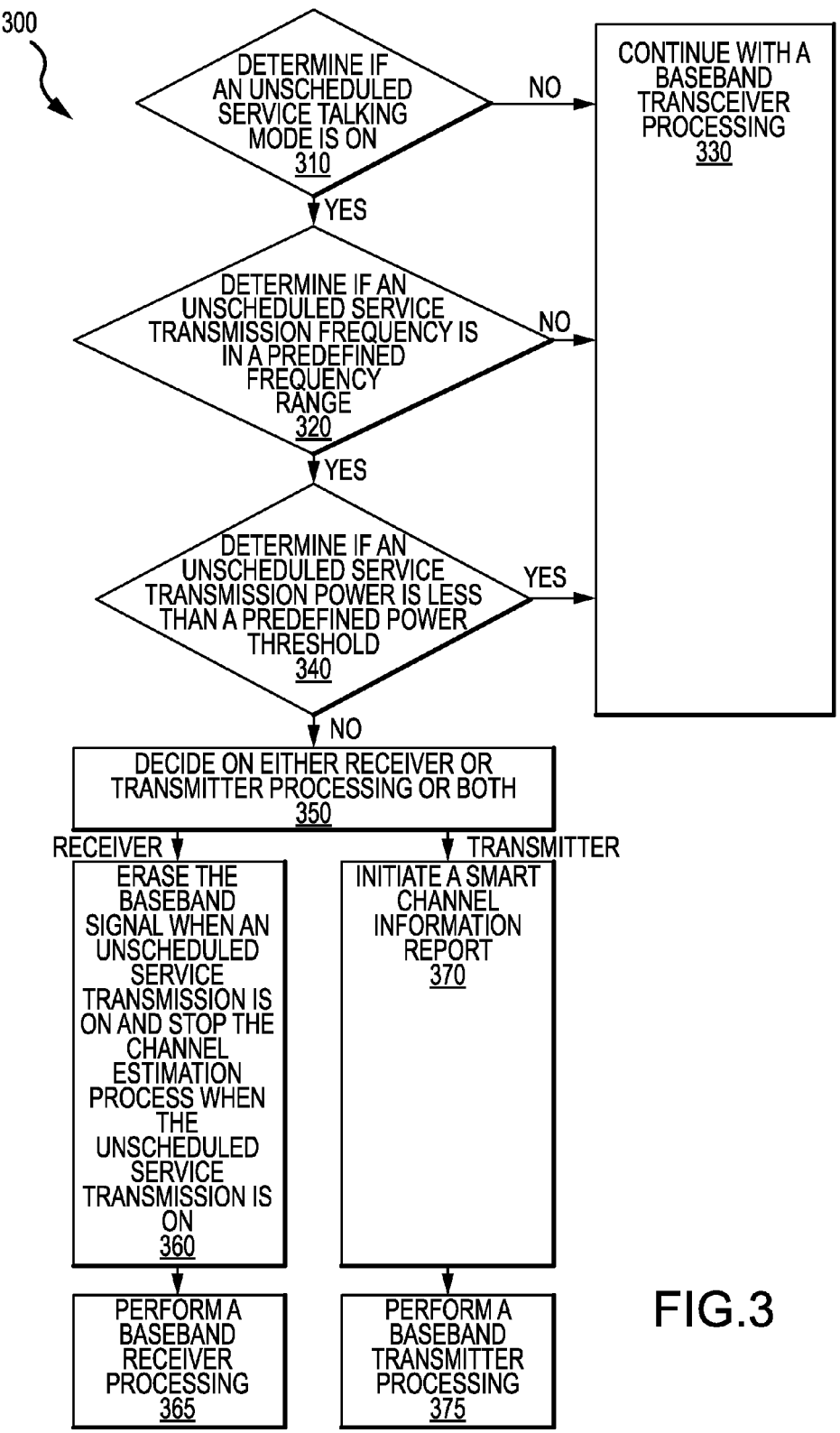
FIG. 3 illustrates an example flow diagram for unscheduled service interference mitigation for a scheduled service receiver in a dual mode user device.

FIG. 3 illustrates an example flow diagram for unscheduled service interference mitigation for a scheduled service receiver in a dual mode user device. In block 310, determine if an unscheduled service talking mode is ON. In one example, the unscheduled service talking mode coexists with a scheduled service mode. In one example, an unscheduled service transmit (TX) band overlaps with a scheduled service receive (RX) band or is adjacent to a scheduled service receive (RX) band. In one example, an unscheduled service transmission timing is known, for example, by an access terminal (e.g., user device). In one example, the unscheduled service is GSM. And, in one example, the scheduled service is one of the following: LTE FDD, LTE TDD, HSPA, TD-SCDMA, TD-SCDMA with HSPA, IEEE802.16d, IEEE802.16e, IEEE802.16m, IEEE802.11ac, IEEE802.11n, or HRPD. If the unscheduled service talking mode is not ON, proceed to block 330.

In block 330, continue with a baseband transceiver processing. In one example, the baseband transceiver processing is a routine and regular baseband transceiver processing. If the unscheduled service talking mode is ON, proceed to block 320. In block 320, determine if an unscheduled service transmission frequency is in a predefined frequency range. If yes, proceed to block 340. If no, proceed to block 330. In block 340, determine if an unscheduled service transmission power is less than a predefined power threshold. If yes, proceed to block 330. If no, proceed to block 350. In one example, the unscheduled service power level threshold is based on one or more of the following: unscheduled service transmission frequency, isolation or FEC design in a handset or chipset. In one example, the isolation describes the coupling between the transmitter and the receiver. In one example, the FEC design is based on one of the following: a block code, a convolutional code, a concatenated code or a turbo code. In another example, the FEC design includes interleaving. In one example, the functional relationship between unscheduled service power level threshold and unscheduled service transmission frequency is optimized for a handset and chipset design.

In block 350, decide on either receiver or transmitter processing or both. For receiver processing, proceed to block 360.

In block 360, erase the baseband signal when an unscheduled service transmission is ON and stop the channel estimation process when the unscheduled service transmission is ON. In one example, an unscheduled service transmitter is in DTX mode. When the unscheduled service transmitter is enabled, the transmission is in a burst mode, and an unscheduled service UE transmitter will transmit a signal only during a fractional time in a certain time period. In one example, during receiver processing, the unscheduled service transmission ON refers to the period that a signal is being transmitted, which is a fraction of the time that the unscheduled service transmitter is enabled. The scheduled service receiver stops the channel estimation only and erases the scheduled service received signal during the fraction of time that the unscheduled service signal is being transmitted.

In one example, the erasing step sets the baseband signal magnitude to zero in the portions of the baseband signal with large interference. In one example, wherein if the portions of the baseband signal being erased comprises a pilot, a pilot channel measurement associated with the pilot is disabled (i.e., set to OFF). In one example, the unscheduled service transmission is in-band interference. In another example, the unscheduled service transmission is out-of-band interference.

Following block 360, proceed to block 365. In block 365, perform a baseband receiver processing. In one example, the baseband receiver processing is a routine and regular baseband receiver processing. For transmitter processing, proceed to block 370. In block 370, initiate a smart channel information report. In one example, a smart channel information report includes a DRC report time selection and a DRC report content decision. In one example, the initiating step includes reporting a data rate condition to an access node (AN) so that the AN can avoid packet transmission to an access terminal (AT) at a timeslot which has a potential preamble or identifier container collision. In one example, the data rate condition is a zero data rate. In another example, the data rate condition is a DRC NULL. In one example, the smart channel information report adapts a forward error correction (FEC) capability with an eraser. In one example, the smart channel information report is based on an adjusted smart channel information report look-up table, wherein the smart channel information report look-up table may be a DRC report look-up table. In one example, the smart channel information report results in a transmission format selection with a SINR backoff selection and a data rate selection as intermediate results.

In one example, the SINR backoff represents an increase in SINR value. In one example, the format of the forward traffic channel (FTC) transmission is expressed as anyone of the following: a physical layer packet size in bits, a nominal transmit duration in slots or a preamble length in chips. Following block 370, proceed to block 375. In block 375, perform a baseband transmitter processing. In one example, the baseband transmitter processing is a routine and regular baseband transmitter processing.

One skilled in the art would understand that the steps disclosed in the example flow diagram in FIG. 3 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 4:
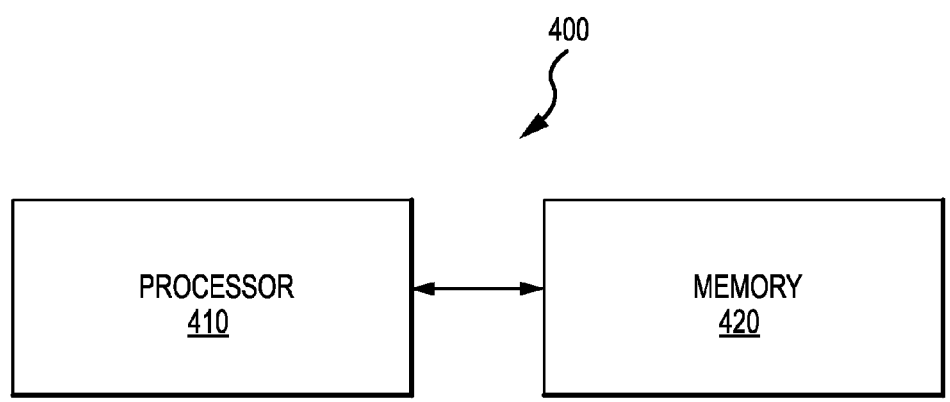
FIG. 4 illustrates an example of a device comprising a processor in communication with a memory for executing the processes for interference mitigation in a dual mode device.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 4 illustrates an example of a device 400 comprising a processor 410 in communication with a memory 420 for executing the processes for interference mitigation in a dual mode device. In one example, the device 400 is used to implement the algorithm illustrated in FIG. 3. In one aspect, the memory 420 is located within the processor 410. In another aspect, the memory 420 is external to the processor 410. In one aspect, the processor includes circuitry for implementing or performing the various flow diagrams, logical blocks and/or modules described herein.

Figure 5:
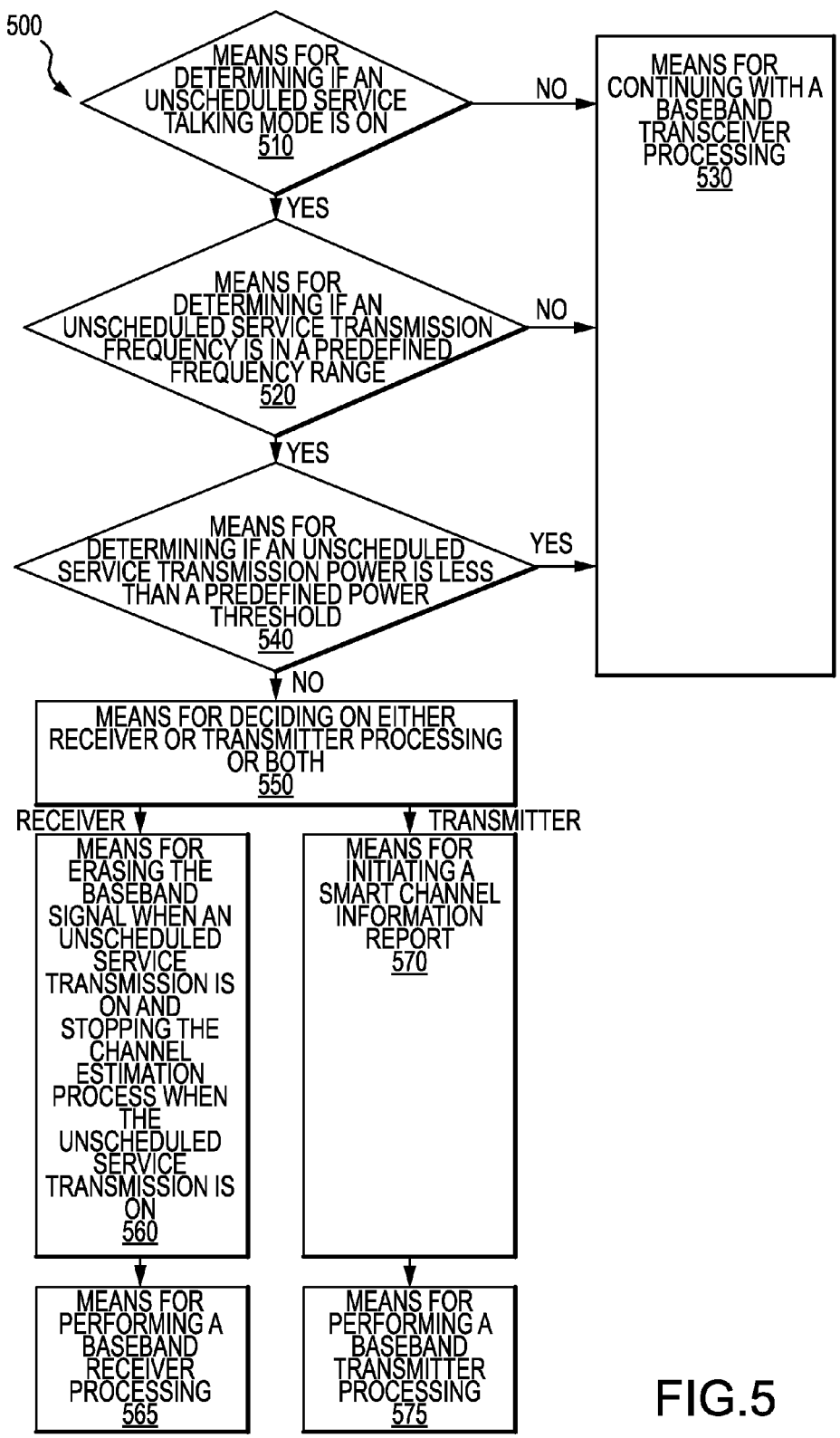
FIG. 5 illustrates an example of a device suitable for interference mitigation in a dual mode device.

FIG. 5 illustrates an example of a device 500 suitable for interference mitigation in a dual mode device. In one aspect, the device 500 is implemented by at least one processor comprising one or more modules configured to provide different aspects of interference mitigation in a dual mode device as described herein in blocks 510, 520, 530, 540, 550, 560, 565, 570 and 575. For example, each module comprises hardware, firmware, software, or any combination thereof. In one aspect, the device 500 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for interference mitigation comprising:
determining whether a frequency of an unscheduled service transmission signal is within a predefined frequency range;
determining whether a power level of the unscheduled service transmission signal satisfies a predefined power threshold; and
in response to a determination that the frequency is within the predefined frequency range and a determination that the power level does not satisfy the predefined power threshold, performing one or both of the following:
erasing a baseband signal associated with a scheduled service reception signal during a time period when an unscheduled service transmission is on, wherein the unscheduled service transmission signal interferes with the baseband signal; and
initiating a smart channel information report, wherein initiating the smart channel information report includes reporting information to an access node that helps the access node avoid packet transmission in a timeslot that corresponds to a potential collision between a portion of the unscheduled service transmission signal and a portion of the scheduled service reception signal.

2. The method of claim 1, further comprising stopping a channel estimation process associated with the baseband signal in response to erasing the baseband signal.

3. The method of claim 1, further comprising processing the unscheduled service transmission signal and the scheduled service reception signal in response to a determination that the frequency is not within the predefined frequency range or in response to a determination that the power level satisfies the predefined power threshold.

4. The method of claim 1, wherein the unscheduled service transmission signal corresponds to a Global System for Mobile Communications (GSM) protocol and the scheduled service reception signal corresponds to a Long Term Evolution (LTE) protocol.

5. The method of claim 1, further comprising processing the unscheduled service transmission signal in response to erasing the baseband signal.

6. The method of claim 1, further comprising processing the scheduled service reception signal based on the smart channel information report.

7. The method of claim 1, wherein erasing the baseband signal includes setting a magnitude of at least one portion of the baseband signal to zero.

8. The method of claim 7, wherein the at least one portion of the baseband signal corresponds to a portion of the baseband signal that is interfered with by the unscheduled service transmission signal.

9. The method of claim 7, wherein the at least one portion of the baseband signal includes a pilot and wherein a pilot channel measurement associated with the pilot is disabled.

10. The method of claim 1, wherein the information includes a data rate condition reported to the access node, wherein the data rate condition includes information regarding timeslots that correspond to the potential collision between the portion of the unscheduled service transmission signal and the portion of the scheduled service reception signal.

11. The method of claim 10, wherein the portion of the scheduled service reception signal includes a preamble of the scheduled service reception signal.

12. The method of claim 11, wherein the access node prevents transmission of the preamble of the scheduled service reception signal during the timeslots when the data rate condition is null.

13. The method of claim 1, wherein the smart channel information report includes a data rate control (DRC) report time selection and a DRC report content decision.

14. The method of claim 1, further comprising determining whether a talking mode associated with the unscheduled service transmission signal is activated.

15. The method of claim 1, wherein the power level is based on at least one of the frequency, coupling between a transmitter associated with the unscheduled service transmission signal and a receiver associated with the scheduled service reception signal, or a forward error correction (FEC) in a handset or chipset.

16. The method of claim 1, wherein the power level satisfies the predefined power threshold when the power level is less than the predefined power threshold.

17. The method of claim 1, wherein the power level does not satisfy the predefined power threshold when the power level is greater than or equal to the predefined power threshold.

18. The method of claim 1, wherein the unscheduled service transmission signal corresponds to one of a Global System for Mobile Communications (GSM) protocol or a Time Division Synchronous Code Division Multiple Access (TD-SCDMA) protocol.

19. The method of claim 1, wherein the scheduled service reception signal corresponds to one of a Long Term Evolution (LTE) Frequency Division Duplexing protocol, a LTE Time Division Duplexing protocol, a High Speed Packet Access (HSPA) protocol, an Institute of Electrical and Electronics Engineers (IEEE) 802.16d protocol, an IEEE 802.16e protocol, an IEEE 802.16m protocol, an IEEE 802.11ac protocol, an IEEE 802.11n protocol, an IEEE 802.11 protocol, an IEEE 802.20 protocol, or a High Rate Packet Data (HRPD) protocol.

20. An apparatus comprising:
a memory; and
a processor coupled to the memory, wherein the processor is configured to:
determine whether a frequency of an unscheduled service transmission signal is within a predefined frequency range;
determine whether a power level of the unscheduled service transmission signal satisfies a predefined power threshold; and
in response to a determination that the frequency is within the predefined frequency range and a determination that the power level does not satisfy the predefined power threshold, perform one or both of the following:
erase a baseband signal associated with a scheduled service reception signal during a time period when an unscheduled service transmission is on, wherein the unscheduled service transmission signal interferes with the baseband signal; and
initiate a smart channel information report, wherein the smart channel information report includes reporting information to an access node that helps the access node avoid packet transmission in a timeslot that corresponds to a potential collision between a portion of the unscheduled service transmission signal and a portion of the scheduled service reception signal.

21. The apparatus of claim 20, wherein the processor is further configured to stop a channel estimation process associated with the baseband signal in response to erasing the baseband signal.

22. The apparatus of claim 20, wherein the processor is further configured to process the unscheduled service transmission signal and the scheduled service reception signal in response to a determination that the frequency is not within the predefined frequency range or in response to a determination that the power level satisfies the predefined power threshold.

23. The apparatus of claim 20, wherein the unscheduled service transmission signal corresponds to a Global System for Mobile Communications (GSM) protocol and the scheduled service reception signal corresponds to a Long Term Evolution (LTE) protocol.

24. The apparatus of claim 20, wherein the processor is further configured to process the unscheduled service transmission signal in response to erasing the baseband signal.

25. The apparatus of claim 20, wherein the processor is further configured to process the scheduled service reception signal based on the smart channel information report.

26. The apparatus of claim 20, wherein erasing the baseband signal includes setting a magnitude of at least one portion of the baseband signal to zero.

27. The apparatus of claim 26, wherein the at least one portion of the baseband signal corresponds to a portion of the baseband signal that is interfered with by the unscheduled service transmission signal.

28. The apparatus of claim 26, wherein the at least one portion of the baseband signal includes a pilot and wherein a pilot channel measurement associated with the pilot is disabled.

29. The apparatus of claim 20, wherein a first bandwidth associated with the unscheduled service transmission signal overlaps a second bandwidth associated with the scheduled service reception signal.

30. The apparatus of claim 20, wherein a first bandwidth associated with the unscheduled service transmission signal is adjacent to a second bandwidth associated with the scheduled service reception signal.

31. The apparatus of claim 20, wherein the unscheduled service transmission signal corresponds to one of a Global System for Mobile Communications (GSM) protocol or a Time Division Synchronous Code Division Multiple Access (TD-SCDMA) protocol.

32. The apparatus of claim 20, wherein the scheduled service reception signal corresponds to one of a Long Term Evolution (LTE) Frequency Division Duplexing protocol, a LTE Time Division Duplexing protocol, a High Speed Packet Access (HSPA) protocol, an Institute of Electrical and Electronics Engineers (IEEE) 802.16d protocol, an IEEE 802.16e protocol, an IEEE 802.16m protocol, an IEEE 802.11ac protocol, an IEEE 802.11n protocol, an IEEE 802.11 protocol, an IEEE 802.20 protocol, or a High Rate Packet Data (HRPD) protocol.

33. An apparatus comprising:
means for determining whether a frequency of an unscheduled service transmission signal is within a predefined frequency range;
means for determining whether a power level of the unscheduled service transmission signal satisfies a predefined power threshold; and
means for performing, in response to a determination that the frequency is within the predefined frequency range and a determination that the power level does not satisfy the predefined power threshold, one or both of the following:
erasing a baseband signal associated with a scheduled service reception signal during a time period when an unscheduled service transmission is on, wherein the unscheduled service transmission signal interferes with the baseband signal; and
initiating a smart channel information report, wherein initiating the smart channel information report includes reporting information to an access node that helps the access node avoid packet transmission in a timeslot that corresponds to a potential collision between a portion of the unscheduled service transmission signal and a portion of the scheduled service reception signal.

34. The apparatus of claim 33, further comprising means for stopping a channel estimation process associated with the baseband signal.

35. The apparatus of claim 33, further comprising means for processing the unscheduled service transmission signal and the scheduled service reception signal in response to a determination that the frequency is not within the predefined frequency range or in response to a determination that the power level satisfies the predefined power threshold.

36. The apparatus of claim 33, wherein the unscheduled service transmission signal corresponds to a Global System for Mobile Communications (GSM) protocol and the scheduled service reception signal corresponds to a Long Term Evolution (LTE) protocol.

37. The apparatus of claim 33, further comprising means for processing the unscheduled service transmission signal, wherein the unscheduled service transmission signal is processed in response to erasing the baseband signal.

38. The apparatus of claim 33, further comprising means for processing the scheduled service reception signal based on the smart channel information report.

39. The apparatus of claim 33, wherein erasing the baseband signal includes setting a magnitude of at least one portion of the baseband signal to zero.

40. The apparatus of claim 39, wherein the at least one portion of the baseband signal corresponds to a portion of the baseband signal that is interfered with by the unscheduled service transmission signal.

41. The apparatus of claim 39, wherein the at least one portion of the baseband signal includes a pilot and wherein a pilot channel measurement associated with the pilot is disabled.

42. The apparatus of claim 33, wherein the information includes a data rate condition reported to the access node, wherein the data rate condition includes information regarding timeslots that correspond to the potential collision between the portion of the unscheduled service transmission signal and the portion of the scheduled service reception signal.

43. The apparatus of claim 42, wherein the portion of the scheduled service reception signal includes a preamble of the scheduled service reception signal.

44. The apparatus of claim 43, wherein the access node prevents transmission of the preamble of the scheduled service reception signal during the timeslots when the data rate condition is null.

45. The apparatus of claim 33, wherein the smart channel information report includes a data rate control (DRC) report time selection and a DRC report content decision.

46. The apparatus of claim 33, further comprising means for determining whether a talking mode associated with the unscheduled service transmission signal is activated.

47. The apparatus of claim 33, wherein the power level is based on at least one of the frequency, coupling between a transmitter associated with the unscheduled service transmission signal and a receiver associated with the scheduled service reception signal, or a forward error correction (FEC) in a handset or chipset.

48. The apparatus of claim 33, wherein the power level satisfies the predefined power threshold when the power level is less than the predefined power threshold.

49. The apparatus of claim 33, wherein the power level does not satisfy the predefined power threshold when the power level is greater than or equal to the predefined power threshold.

50. The apparatus of claim 33, wherein the unscheduled service transmission signal corresponds to one of a Global System for Mobile Communications (GSM) protocol or a Time Division Synchronous Code Division Multiple Access (TD-SCDMA) protocol.

51. The apparatus of claim 33, wherein the scheduled service reception signal corresponds to one of a Long Term Evolution (LTE) Frequency Division Duplexing protocol, a LTE Time Division Duplexing protocol, a High Speed Packet Access (HSPA) protocol, an Institute of Electrical and Electronics Engineers (IEEE) 802.16d protocol, an IEEE 802.16e protocol, an IEEE 802.16m protocol, an IEEE 802.11ac protocol, an IEEE 802.11n protocol, an IEEE 802.11 protocol, an IEEE 802.20 protocol, or a High Rate Packet Data (HRPD) protocol.

52. A non-transitory computer-readable storage medium comprising instructions that, when executed by a processor, cause the processor to:
  determine whether a frequency of an unscheduled service transmission signal is within a predefined frequency range;
  determine whether a power level of the unscheduled service transmission signal satisfies a predefined power threshold; and
  in response to a determination that the frequency is within the predefined frequency range and a determination that the power level does not satisfy the predefined power threshold, perform one or both of the following:
    erasing a baseband signal associated with a scheduled service reception signal during a time period when an unscheduled service transmission is on, wherein the unscheduled service transmission signal interferes with the baseband signal; and
    initiating a smart channel information report, wherein initiating the smart channel information report includes reporting information to an access node that helps the access node avoid packet transmission in a timeslot that corresponds to a potential collision between a portion of the unscheduled service transmission signal and a portion of the scheduled service reception signal.

53. The non-transitory computer-readable storage medium of claim 52, further comprising instructions that, when executed by the processor, cause the processor to stop a channel estimation process associated with the baseband signal in response to erasing the baseband signal.

54. The non-transitory computer-readable storage medium of claim 52, wherein the information includes a data rate condition reported to the access node, wherein the data rate condition includes information regarding timeslots that correspond to the potential collision between the portion of the unscheduled service transmission signal and the portion of the scheduled service reception signal.

55. The non-transitory computer-readable storage medium of claim 54, wherein the portion of the scheduled service reception signal includes a preamble of the scheduled service reception signal.

56. The non-transitory computer-readable storage medium of claim 55, wherein erasing the baseband signal includes setting a magnitude of at least one portion of the baseband signal to zero.

57. The non-transitory computer-readable storage medium of claim 56, wherein the at least one portion of the baseband signal corresponds to a portion of the baseband signal that is interfered with by the unscheduled service transmission signal.

58. The non-transitory computer-readable storage medium of claim 56, wherein the at least one portion of the baseband signal includes a pilot and wherein a pilot channel measurement associated with the pilot is disabled.

59. The non-transitory computer-readable storage medium of claim 52, wherein the unscheduled service transmission signal corresponds to a Global System for Mobile Communications (GSM) protocol and the scheduled service reception signal corresponds to a Long Term Evolution (LTE) protocol.

\* \* \* \* \*